United States Patent [19]

Miller

[11] Patent Number: 5,079,693

[45] Date of Patent: Jan. 7, 1992

[54] BIDIRECTIONAL FIFO BUFFER HAVING REREAD AND REWRITE MEANS

[75] Inventor: Michael J. Miller, Saratoga, Calif.

[73] Assignee: Integrated Device Technology, Inc., Santa Clara, Calif.

[21] Appl. No.: 317,204

[22] Filed: Feb. 28, 1989

[51] Int. Cl.[5] .............................................. G06F 5/06
[52] U.S. Cl. .................... 395/250; 364/238.6;
 364/239; 364/239.1; 364/239.6; 364/239.8;
 364/926.1; 364/939; 364/939.4; 364/939.7
[58] Field of Search ................................ 364/200, 900

[56] References Cited

U.S. PATENT DOCUMENTS

| | | | |
|---|---|---|---|
| 4,112,490 | 9/1978 | Pohlman et al. | 364/200 |
| 4,144,562 | 3/1979 | Cooper | 364/200 |
| 4,213,177 | 7/1980 | Schmidt | 364/200 |
| 4,467,447 | 8/1984 | Takahashi et al. | 364/900 |
| 4,571,671 | 2/1986 | Burns et al. | 364/200 |
| 4,626,985 | 12/1986 | Briggs | 364/200 |
| 4,868,784 | 9/1989 | Marschall et al. | 364/900 |
| 4,882,702 | 11/1989 | Struger et al. | 364/900 |

Primary Examiner—Stuart N. Hecker
Assistant Examiner—Rebecca L. Rudolph
Attorney, Agent, or Firm—Thomas E. Schatzel

[57] ABSTRACT

A FIFO buffer in accordance with the present invention employs a 1K by eighteen FIFO (A→B) buffer portion to store eighteen-bit words; an eighteen-bit-to-nine-bit multiplexer portion to convert (fold) stored eighteen-bit words into two, nine-bit words; a nine-bit-to-sixteen-bit multiplexer portion to convert (assemble) pairs of nine-bit words into one, eighteen-bit word; a 1K by eighteen FIFO (B→A) buffer portion to store (eighteen-bit) words; eighteen, tri-state, buffers to permit direct communication; a parity generator portion; a parity checking portion; the combination of an A-port access control portion and a programmable flag logic portion to permit connection to a sixteen-bit or a thirty-two-bit microprocessor; and the combination of a B-port access control portion and a hand shake interface control portion to permit connection to an eight-bit microprocessor, a non-direct memory access DMA type peripheral device, or a DMA-type peripheral device.

11 Claims, 8 Drawing Sheets

Fig_1

Fig_2

Fig_3

Fig.4
REREAD POINTER LOGIC

Fig.5
REWRITE POINTER LOGIC

A TO B FIFO RAM AND READ/WRITE POINTERS  *Fig_6*

B TO A FIFO RAM AND READ/WRITE POINTERS  *Fig_7*

LATCH IN READ PATH OF VALID BIT AND EVEN BYTE  *Fig_8*

SAVE LATCH FOR EVEN BYTE LATCH REWRITE FUNCTION  *Fig_9*

| BIT | STATUS REGISTER LAYOUT #0 |
|---|---|
| 0 | |
| 1 | |
| 2 | |
| 3 | EVEN BYTE LATCH BITS 0::7 |
| 4 | |
| 5 | |
| 6 | |
| 7 | |
| 8 | VALID BIT |
| 9 | WRITE PARITY ERROR |
| 10 | READ PARITY ERROR |
| 11 | STATUS FORMAT: 0 |
| 12 | A→B FULL |
| 13 | A→B FULL-OFFSET |
| 14 | B→A EMPTY |
| 15 | B→A EMPTY + OFFSET |

| BIT | STATUS REGISTER LAYOUT #1 |
|---|---|
| 0 | RESERVED |
| 1 | RESERVED |
| 2 | RESERVED |
| 3 | DMA DIRECTION |
| 4 | A→B EMPTY |
| 5 | A→B EMPTY + OFFSET |
| 6 | B→A FULL |
| 7 | B→A FULL - OFFSET |
| 8 | VALID BIT |
| 9 | WRITE PARITY ERROR |
| 10 | READ PARITY ERROR |
| 11 | STATUS FORMAT: 1 |
| 12 | A→B FULL |
| 13 | A→B FULL-OFFSET |
| 14 | B→A EMPTY |
| 15 | B→A EMPTY + OFFSET |

*Fig._14*   STATUS REGISTER

REG 0: [15 ... 9 8 ... 0]  NOT USED | A→B EMPTY OFFSET

REG 1: [15 ... 9 8 ... 0]  NOT USED | A→B FULL OFFSET

REG 2: [15 ... 9 8 ... 0]  NOT USED | B→A EMPTY OFFSET

REG 3: [15 ... 9 8 ... 0]  NOT USED | B→A FULL OFFSET

REG 4: [15 13 12 ... 8 7 ... 4 3 ... 0]  FLAG D POL & SEL | FLAG C POL & SEL | FLAG B POL & SEL | FLAG A POL & SEL

REG 5: [15 ... 0]  MISC MODE CONFIGURATION

REG 6: [15 ... 0]  RESERVED

REG 7: [15 ... 0]  RESERVED

*Fig._15*   CONFIGURATION REGISTERS

| SEL | SELECTED FLAG | SEL | SELECTED FLAG |
|---|---|---|---|
| 0000 | EMPTY A→B | 1000 | $\overline{\text{EMPTY A→B}}$ |
| 0001 | EMPTY+OFFSET A→B | 1001 | $\overline{\text{EMPTY+OFFSET A→B}}$ |
| 0010 | FULL A→B | 1010 | $\overline{\text{FULL A→B}}$ |
| 0011 | FULL+OFFSET A→B | 1011 | $\overline{\text{FULL+OFFSET A→B}}$ |
| 0100 | EMPTY B→A | 1100 | $\overline{\text{EMPTY B→A}}$ |
| 0101 | EMPTY+OFFSET B→A | 1101 | $\overline{\text{EMPTY+OFFSET B→A}}$ |
| 0110 | FULL B→A | 1110 | $\overline{\text{FULL B→A}}$ |
| 0111 | FULL+OFFSET B→A | 1111 | $\overline{\text{FULL+OFFSET B→A}}$ |

FLAG POLARITY AND SELECTION CODES  *Fig_16*

| BIT | FUNCTION |
|---|---|
| 0 | SELECT: DS*& R/W OR R*& W* |
| 1 | BYTE ORDER OF 16-BIT WORD |
| 2 | ENABLE REREAD FUNCTION |
| 3 | ENABLE REWRITE FUNCTION |
| 4 | REQ POLARITY |
| 5 | ACK POLARITY |
| 6::9 | REQ/ACK TIMING |
| 10 | INTERFACE MODE SELECT |
| 11::12 | EXPANSION MODE |
| 13 | UNUSED |
| 14 | UNUSED |
| 15 | UNUSED |

| 12 | 11 | |
|---|---|---|
| 0 | 0 | STAND ALONE MODE |
| 0 | 1 | RESERVED |
| 1 | 0 | EXPANDED LEAST SIGNIFICANT | SLAVE
| 1 | 1 | EXPANDED MOST SIGNIFICANT | MASTER

REGISTER 5 FUNCTION AND BIT ASSIGNMENT  *Fig_17*

| 15-12 | 11 | 10 | 9 | 8 | 7   0 |
|---|---|---|---|---|---|
| UNUSED | SELECT PARITY ERROR ON FLAG A | PARITY ODD/EVEN | PARITY OUT CONTROL A→B | PARITY IN CONTROL B→A | UNUSED |

↪ 0: DEFAULT, DISABLE PARITY GENERATE, ENABLE PARITY CHECK
1: ENABLE PARITY GENERATE DISABLE PARITY CHECK

↪ 0: DEFAULT, DISABLE PARITY GENERATE, ENABLE PARITY CHECK
1: ENABLE PARITY GENERATE DISABLE PARITY CHECK

↪ 0: EVEN
1: ODD, DEFAUT

*Fig_18*

REGISTER 7

Fig_19

Fig_20

BIDIRECTIONAL FIFO BUFFER HAVING REREAD AND REWRITE MEANS

BACKGROUND OF THE INVENTION

1. Field of the Invention e present invention relates to integrated circuit type devices generally and more particularly to a bidirectional FIFO buffer having means for eight-bit-to-sixteen-bit and sixteen-bit-to-eight-bit conversion.

2. Description of the Related Art

A FIFO (first-in-first-out) buffer functions as a shift register having an additional control section that permits input data to "fall through" to the first vacant stage. In other words, if there is data stored in the FIFO buffer, it is available at the output even though all of the stages are not filled. Thus, in effect, a FIFO buffer functions as a "variable-length" shift register, the length of which is always the same as the data stored therein. (Although shift registers may be used, of late, many FIFO buffers are implemented with random access memories (RAMs) and counters.) For additional information regarding FIFO buffers, the reader is referred to my U.S. Pat. No. 4,750,149.

As such, FIFO buffers are particularly suited for use in applications in which there is a need to compensate for differences in the rate of flow of data. For example, FIFO buffers are particularly suited for use in storing data which is to be written onto a disk and/or which has been read off of a disk; for use in storing data which is to be transmitted to a local area network (LAN) and/or which has been received from a LAN; and for use in storing data which is to be printed.

Heretofore, no doubt due to the predominance of eight-bit microprocessors and/or eight-bit peripherals, most FIFO buffers have been designed with an eight-bit word length (to store eight bits of data at a time.) Of late, however, sixteen-bit and thirty-two-bit microprocessors have been gaining in popularity. Although many sixteen-bit and thirty-two-bit microprocessors have means for communicating with eight-bit peripherals (and FIFO buffers), such communication is, usually, less efficient than communication with sixteen-bit and/or thirty-two-bit peripherals. Thus, a need exists for FIFO buffers which have means for eight-bit-to-sixteen-bit and sixteen-bit-to-eight-bit conversion.

Also, since data may be corrupted when transmitted over a LAN, a need exists for FIFO buffers which have means for re-reading (for re-transmission) data stored in the buffer and/or re-writing (over-writing) data stored in the buffer (with re-transmitted data).

In addition, a need exists for FIFO buffers suitable for interfacing sixteen-bit and thirty-two-bit microprocessors with eight-bit microprocessors, non-direct memory access (DMA) type peripheral devices, and DMA-type peripheral devices.

Further, a need exists for FIFO buffers having means for direct (by-pass) communication with peripheral devices.

SUMMARY OF THE INVENTION

It is therefore the primary object of the present invention to provide a FIFO buffer having means for eight-bit-to-sixteen-bit and sixteen-bit-to-eight-bit conversion.

Another object of the present invention is to provide a FIFO buffer having means for re-reading and re-writing data.

Another object of the present invention is to provide a FIFO buffer suitable for interfacing sixteen-bit and thirty-two-bit microprocessors with eight-bit microprocessors, non-DMA type peripheral devices, and DMA-type peripheral devices.

Yet another object of the present invention is to provide a FIFO buffer having means for direct (by-pass) communication with peripheral devices.

Briefly, the presently preferred embodiment of a bidirectional FIFO buffer in accordance with the present invention employs a 1 K by eighteen FIFO (A→B) buffer portion to store eighteen-bit words; an eighteen-bit-to-nine-bit multiplexer portion to convert (fold) stored eighteen-bit words into two, nine-bit words; a nine-bit-to-sixteen-bit multiplexer portion to convert (assemble) pairs of nine-bit words into one, eighteen-bit word; a 1 K by eighteen FIFO (B→A) buffer portion to store (eighteen-bit) words; eighteen, tri-state, buffers to permit direct communication; a parity generator portion; a parity checking portion; the combination of an A-port access control portion and a programmable flag logic portion to permit connection to a sixteen-bit or a thirty-two-bit microprocessor; and the combination of a B-port access control portion and a hand shake interface control portion to permit connection to an eight-bit microprocessor, a non-direct memory access (DMA) type peripheral device, or a DMA-type peripheral device.

These and other objects of the present invention will no doubt become apparent to those skilled in the art after having read the detailed description of the presently preferred embodiment of the present invention which is illustrated in the figures of the drawing.

BRIEF DESCRIPTION OF THE DRAWING

FIGS. 15-18 are diagrams illustrating a number of configuration registers of the A-port access control portion shown in FIG. 1;

DESCRIPTION OF THE PREFERRED EMBODIMENT(S)

Figures 1, 2:
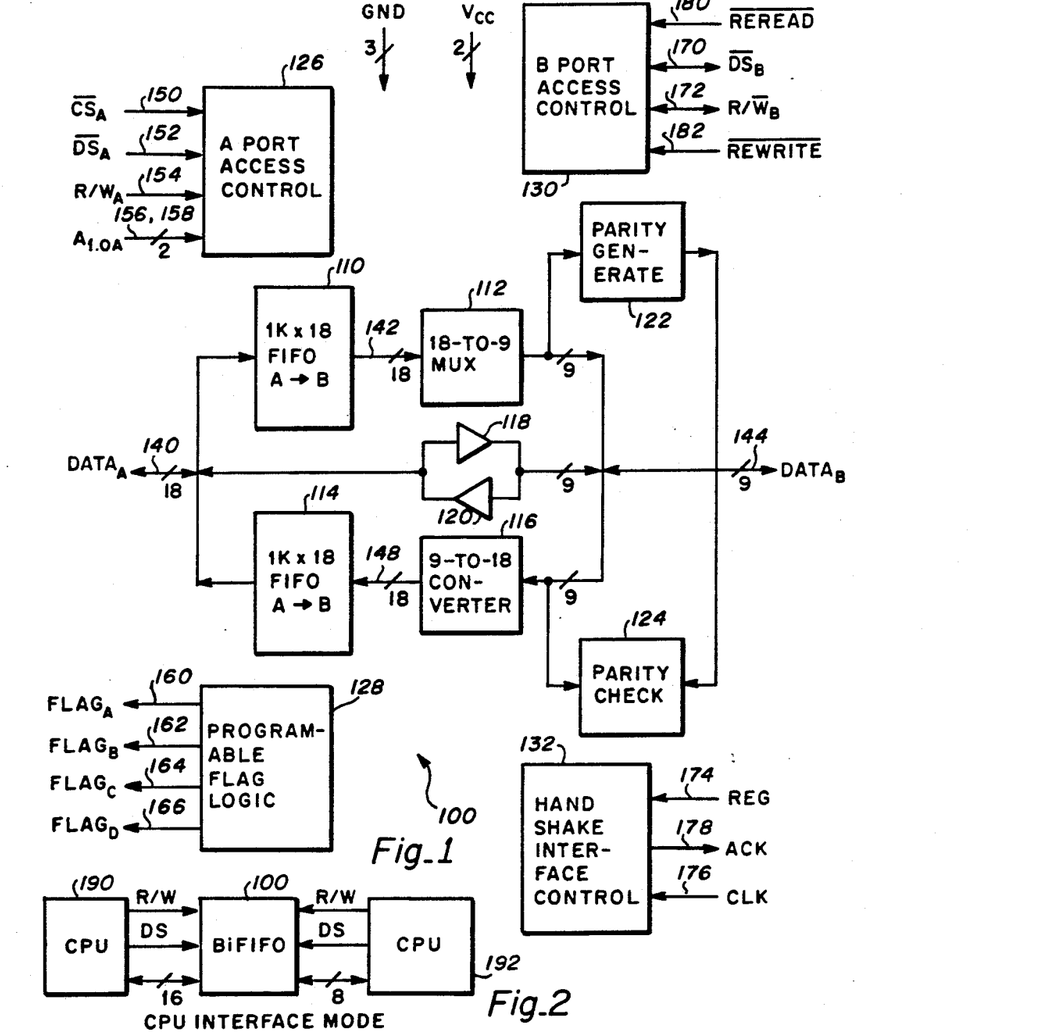
FIG. 1 is a simplified block diagram of a bidirectional FIFO buffer having means for eight-bit-to-sixteen-bit sixteen-bit-to-eight-bit conversion in accordance with the present invention.
FIG. 2 is a block diagram of the FIFO buffer shown in FIG. 1 connected between a sixteen-bit microprocessor and an eight-bit microprocessor.

Illustrated in FIG. 1 of the drawing generally designated by the number 100 is a simplified block diagram of the presently preferred embodiment of a bidirectional FIFO buffer having means for eight-bit-to-sixteen-bit and sixteen-bit-to-eight-bit conversion in accordance with the present invention. FIFO buffer 100 is shown to employ a 1 K by eighteen FIFO (A→B) buffer portion, which is designated 110; an eighteen-bit-to-nine-bit multiplexer portion, which is designated 112; a 1 K by eighteen FIFO (B→A) buffer portion, which is designated 114; a nine-bit-to-sixteen-bit multiplexer portion, which is designated 116; nine, tri-state, buffers, which are represented by a buffer 118; nine more, tri-state, buffers, which are represented by a buffer 120; a parity generator portion, which is designated 122; a parity checking portion, which is designated 124; an A-port access control portion, which is designated 126; a programmable flag logic portion, which is designated 128; a B-port access control portion, which is designated 130; and a hand shake interface control portion, which is designated 132.

FIFO (A→B) buffer portion 110 is configured to store words represented by signals externally developed on an eighteen-line data (A) bus 140. Stored are eighteen-bit words, each of which includes sixteen-bits of data and two, optional, bits of parity. Further, portion 110 is configured to develop on an eighteen line bus 142 signals representing stored (eighteen-bit) words.

Eighteen-bit-to-nine-bit multiplexer portion 112 is configured to receive each of the (eighteen-bit) words represented by signals developed on bus 142. Further, portion 112 is configured to convert {fold) each of the eighteen-bit words into two, nine-bit words. The eighteen-bit words are converted with the eight lower-order bits of the sixteen data bits and the corresponding parity bit forming one of the two nine-bit words and with the eight higher-order bits of the sixteen data bits and the corresponding parity bit forming the other one of the two nine-bit words. Finally, portion 112 is configured to (with a pair of multiplexers, not shown) develop on a nine-line data (B) bus 144 signals representing each of the nine-bit words.

Conversely, Nine-bit-to-sixteen-bit converter portion 116 is configured to receive words represented by signals externally developed on data (B) bus 144. Received are nine-bit words, each of which includes eight-bits of data and one, optional, bit of parity. Further, portion 116 is configured to convert (assemble) each pair of the nine-bit words into one, eighteen-bit word. Finally, portion 116 is configured to develop on an eighteen-line bus 148 signals representing each of the eighteen-bit words.

FIFO (B→A) buffer portion 114 is configured to store (eighteen-bit) words represented by signals developed on the eighteen lines of bus 148 and to develop on the eighteen lines of data (A) bus 140 signals representing stored (eighteen-bit) words.

The nine, tri-state, buffers represented by buffer 118 with a multiplexer and nine buffers, not shown) are configured to, selectively, couple signals externally developed on nine of the eighteen lines of data (A) bus 140 to the nine lines of data (B) bus 144. The lower-order eight data bit signals developed on data (A) bus 140 are coupled to the eight data bit lines of data (B) bus 144; and, the associated bus 140 parity bit signal is coupled to the parity bit line of data (B) bus 144. Conversely, the nine, tri-state, buffers represented by buffer 120 (with nine buffers, not shown) are configured to, selectively, couple signals externally developed on the nine lines of data (B) bus 144 to nine of the eighteen lines of data (A) bus 140. The eight data bit signals developed on data (B) bus 144 are coupled to the eight lower-order data bit lines of bus 140; and, the data (B) bus 144 parity bit signal is coupled to the corresponding parity bit line of bus 140.

Parity generator portion 122 is configured to receive the eight data bit signals developed on eight of the nine data (B) bus 144 lines and to generate, therefrom, a corresponding parity bit signal. Portion 122, selectively, couples the parity bit to the parity bit line of data (B) bus 144. Parity checking portion 124 is configured to compare the parity bit signal developed by parity generator portion 122 with the parity bit signal developed on the parity bit line of data (B) bus 144 and to develop a signal which indicates whether the signals have similar or different logic states.

A-port access control portion 126 includes circuitry which, with data (A) bus 140, is for interfacing FIFO buffer 100 to a (sixteen-bit or thirty-two-bit) microprocessor. Portion 126 is configured to receive five externally developed signals, including an (active low) chip selecting (A) signal on a line 150, an (active low) data strobe (A) signal on a line 152, a read/write signal on a line 154, and a pair of addressing (A(0) and A(1)) signals on a pair of lines 156 and 158.

Programmable flag logic portion 128 develops four, programmable, flags, including a FIFO buffer 100 (A→B) (nearly) empty flag (A) on a line 160, a FIFO buffer 100 (A→B) (nearly) full flag (B) on a line 162, a FIFO buffer 100 (B→A) (nearly) empty flag (C) on a line 164, and a FIFO buffer 100 (B→A) (nearly) full flag (D) on a line 166.

B-port access control portion 130 and hand shake interface control portion 132 include circuitry which, with data (B) bus 144, is for interfacing FIFO buffer 100 to an (eight-bit) microprocessor, a direct memory access (DMA) type peripheral device, or a non-DMA-type peripheral device. In a non-DMA mode, B-port access control portion 130 is configured to receive an externally developed (active low) data strobe (B) signal on a line 170 and a read/write signal on a line 172. In a DMA mode, hand shake interface control portion 132 is configured to receive an externally developed request signal on a line 174 and a clocking signal on a line 176 and to develop an acknowledge signal on a line 178. In this (DMA) mode, B-port access control portion 130 is configured to develop the (active low) data strobe (B) signal on line 170 and the read/write signal on line 172. Further, B-port access control portion 130 is configured to receive an externally developed (active low) re-read (FIFO (A→B) buffer) signal on a line 180 and a re-write (over-write) (FIFO (B→A) buffer) signal on a line 182.

Finally, FIFO buffer 100 employs circuitry permitting buffer 100 to be cascaded with a similar buffer for use with thirty-two-bit microprocessors.

Figure 3:
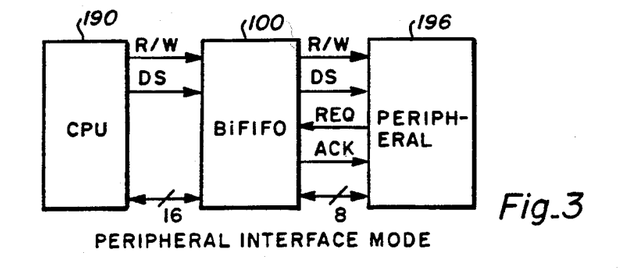
FIG. 3 is a block diagram of the FIFO buffer shown in FIG. 1 connected between the sixteen-bit microprocessor shown in FIG. 2 and a DMA-type peripheral device.

FIFO buffer 100 is shown connected between a sixteen-bit microprocessor 190 and an eight-bit microprocessor 192 in FIG. 2; and, in FIG. 3 the FIFO buffer shown connected between the sixteen-bit microprocessor (190) and a DMA-type peripheral device 196.

Figure 4:
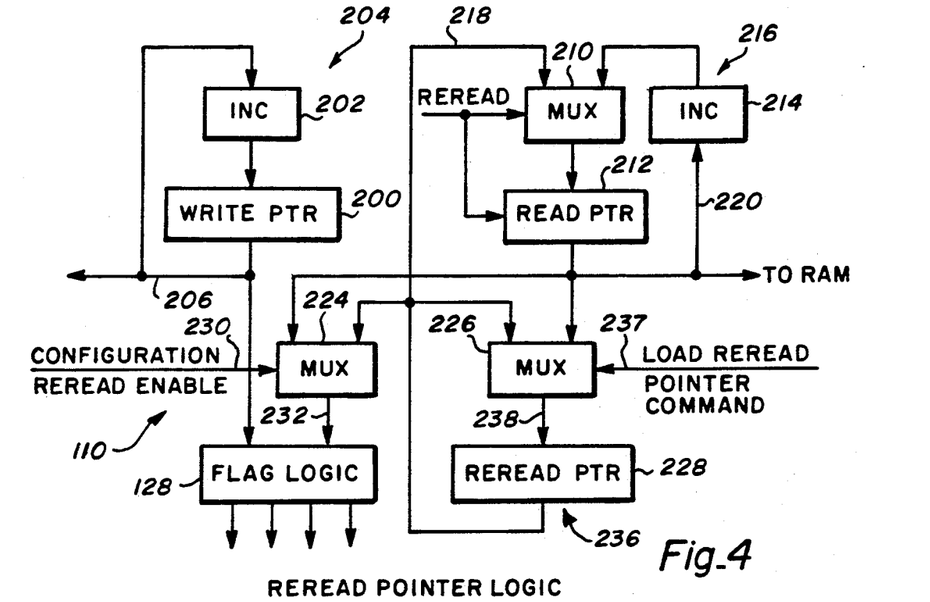
FIG. 4 is a schematic diagram of (a re-read) part of the FIFO (A→B) buffer portion shown in FIG. 1.

FIFO (A→b) buffer portion 110 is implemented with a dual-port, static, 1 K by eighteen, random access memory (RAM) array and counters. The counters, and associated (re-read pointer logic) circuitry are illustrated in FIG. 4. Shown is the combination of a write pointer register 200 and circuitry 202 for incrementing the register, the combination configured to form an eleven-bit counter 204 for developing (FIFO (A→B) buffer portion 110) RAM array addressing, write pointer signals on an eleven line bus 206. For reasons which will become apparent shortly, although the associated RAM array only uses a ten-bit address, counter 204 develops an eleven-bit address.

Also shown is the combination of a multiplexer 210, a read pointer register 212, and circuitry 214 for incrementing the register, the combination configured to form a presetable, twelve-bit counter 216 for loading a re-read address represented by signals developed on a bus 218 and for developing (FIFO (A→B) buffer portion 110) RAM array addressing, read pointer signals on a twelve line bus 220. For reasons which will become apparent shortly, although the associated RAM array only uses a ten-bit address, counter 216 develops a twelve-bit address.

Finally, another multiplexer 224, yet another multiplexer 226, and a re-read pointer latch 228 are shown. Multiplexer 224 is configured to be responsive to a configuration re-read enable signal externally developed on a line 230 and operative to couple either the (FIFO (A→B) buffer portion 110) RAM array addressing, read pointer signals developed on bus 220 or the re-read addressing signals developed on bus 218 to a bus 232 to, with the (FIFO (A→B) buffer portion 110) RAM array addressing, write pointer signals developed on bus 206, drive programmable flag logic portion 128. The combination of multiplexer 226 and re-read pointer latch 228 are configured to form a register 236. Multiplexer 226 is configured to be responsive to a load re-read pointer command signal externally developed on a line 237 and operative to load the (FIFO (A→B) buffer portion 110) RAM array addressing, read pointer signals developed on bus 220 to a bus 238 and into re-read latch 228. Re-read pointer latch 228 is configured to store the state of each of the the (FIFO (A→B) buffer portion 110) RAM array addressing, read pointer signals and to develop the re-read addressing signals on bus 218 so as to have the stored states.

Figure 5:
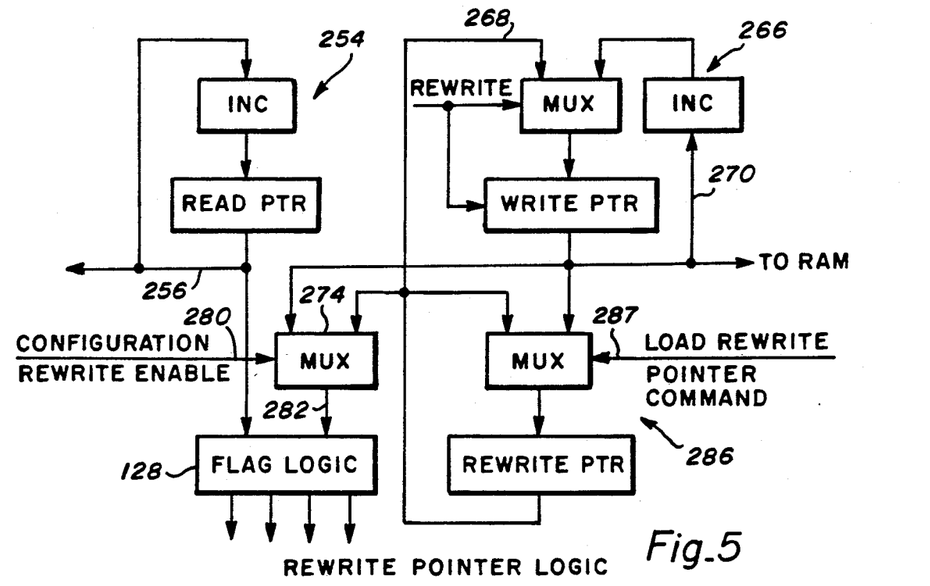
FIG. 5 is a schematic diagram of (a re-write) part of the FIFO (B→A) b portion shown in FIG. 1.

FIFO (B→A) buffer portion 114, which is illustrated in FIG. 5, is similar to FIFO (A→B) buffer portion 110 (FIG. 4). Of course, a (portion 114) counter 254 (which corresponds to portion 110 counter 204) develops (FIFO (B→A) buffer portion 114) RAM array addressing, read pointer signals on a bus 256. Also, a (portion 114) counter 266 (which corresponds to portion 110 counter 216) develops (FIFO (B→A) buffer portion 114) RAM array addressing, write pointer signals on a bus 270. Further, a (portion 114) multiplexer 274 (which corresponds to portion 110 multiplexer 224) is responsive to a configuration re-write enable signal externally developed on a line 280 and operative to couple either the (FIFO (B→A) buffer portion 114) RAM array addressing, write pointer signals developed on bus 270 or re-write addressing signals developed on a bus 268 to a bus 282 to, with the (FIFO (B→A) buffer portion 110) RAM array addressing, read pointer signals developed on bus 256, drive programmable flag logic portion 128. Finally, a (portion 114) register 286 (which corresponds to portion 110 register 236) develops (FIFO (B→A) buffer portion 114) re-write addressing signals on bus 268.

Figure 6:
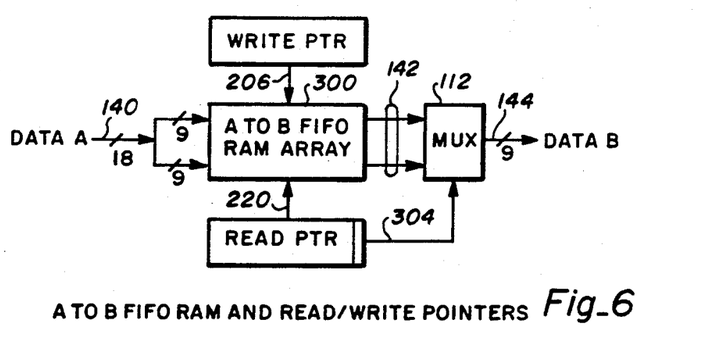
FIG. 6 is a schematic diagram of (a RAM array) part of the FIFO (A→B) buffer portion and the eighteen-bit-to-nine-bit multiplexer the shown in FIG. 1.

The dual-port, static, 1 K by eighteen, random access memory (RAM) array part of FIFO (A→B) buffer portion 110 and eighteen-bit-to-nine-bit multiplexer portion 112 are illustrated in FIG. 6. The RAM array, which is designated 300, is configured with a set of eighteen, read data inputs connected, each input to a corresponding line of the eighteen lines of data (A) bus 140. Also, RAM array 300 is configured with a set of ten, write data addressing inputs each connected to a respective line of bus 206. The RAM array 300 write data addressing inputs are not connected to a line of bus 206 upon which the highest order addressing signal is developed. Rather, the ten RAM array 300 write data addressing inputs are connected each to respective one of the ten lines of bus 206 upon which the next lower order addressing signals are developed. Further, RAM array 300 is configured with a set of ten, read data addressing inputs each connected to a line of bus 220. The RAM array 300 read data addressing inputs are not connected to a line of bus 220 upon which the highest order addressing signal is developed nor to a line 304 of the bus (220) upon which the lowest order addressing signal is developed. Rather, the ten RAM array 300 read data addressing inputs are connected each to respective one of the other ten lines of bus 220. Finally, RAM array 300 is configured and with a set of eighteen, write data outputs each connected to a corresponding line of bus 142.

Eighteen-bit-to-nine-bit multiplexer portion 112 is configured with a first set of nine data inputs each connected to a respective one of the nine lines of bus 142 upon which the signals representing the eight lower-order bits of the sixteen data bits and the corresponding parity bit forming one of the two nine-bit words are developed. In addition, portion 112 is configured with a second set of nine data inputs each connected to a respective one of the nine lines of bus 142 upon which the signals representing the eight higher-order bits of the sixteen data bits and the corresponding parity bit forming the other one of the two nine-bit words are developed. Further, portion 112 is configured with a select input connected to line 304 (the line of bus 220 upon which the lowest order addressing signal is developed). Finally, portion 112 is configured with a set of nine data outputs each coupled by a pair of multiplexers (not shown) and nine buffers (also not shown) to a corresponding one of the nine lines of data (B) bus 144. Further, portion 112 is configured to be responsive to the state of the lowest order addressing signal developed on line 304 of bus 220 and operative to couple either the signals developed at the first portion 112 set of inputs (the bus 142 signals representing the eight lower-order bits of the sixteen data bits and the corresponding parity bit forming one of the two nine-bit words) or the signals developed at the second portion 112 set of data inputs (the bus 142 signals representing the eight higher-order bits of the sixteen data bits and the corresponding parity bit forming the other one of the two nine-bit words) each to the respective one of the nine lines of data (B) bus 144.

Figure 7:
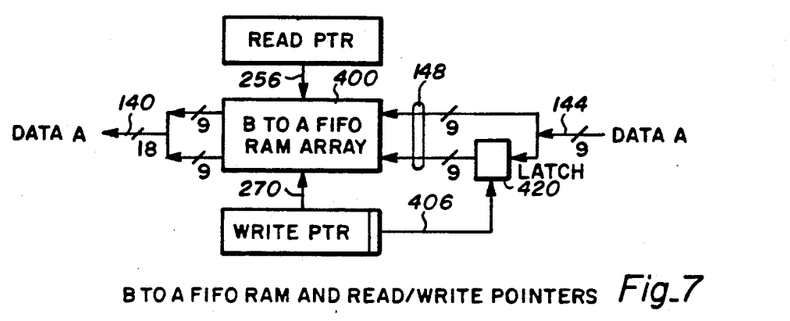
FIG. 7 is a schematic diagram of (a RAM array) part of the FIFO (B ->A) buffer portion and a part of the nine-bit-to-eighteen-bit converter portion, both shown in FIG. 1.

Illustrated in FIG. 7 is a dual-port, static 1 K by eighteen, random-access memory (RAM) array which forms a part of FIFO (B→A) buffer portion 114 and a part of nine-bit-to-eighteen-bit converter portion 116. The RAM array, which is designated 400, is configured with a set of eighteen, write data outputs connected, each output to a corresponding line of the eighteen lines of data (A) bus 140. Also, RAM array 400 is configured with a set of ten, read data addressing inputs each connected to a respective line of bus 256. The RAM array 400 read data addressing inputs are not connected to a line of bus 256 upon which the highest order addressing signal is developed. Rather, the ten RAM array 400 write data addressing inputs are connected each to respective one of the ten lines of bus 256 upon which the next lower order addressing signals are developed. Further, RAM array 400 is configured with a set of ten, write data addressing inputs each connected to a line of bus 270. The RAM array 400 write data addressing inputs are not connected to a line of bus 270 upon which the highest order addressing signal is developed nor to a line 406 of the bus (270) upon which the lowest order addressing signal is developed. Rather, the ten RAM array 400 read data addressing inputs are connected each to respective one of the other ten lines of bus 270. Finally, RAM array 400 is configured with a set of eighteen, read data outputs each connected to a corresponding line of bus 148.

Nine-bit-to-eighteen-bit converter portion 116 is shown to include a latch 420. Latch 420 is configured with a set of nine data outputs each connected to the corresponding line of a nine line bus 422, the lines of which are the nine lines of bus 148 upon which the signals representing the eight lower-order bits of the sixteen data bits and the corresponding parity bit forming one of the two nine-bit words are developed. Additionally, latch 420 is configured with a clock (enable) input connected to line 406 (the line of bus 270 upon which the lowest order addressing signal is developed) and with a set of nine data inputs each coupled by a multiplexer (not shown) and nine buffers (also not shown) to a corresponding one of the nine lines of data (B) bus 144. Further, portion 112 is configured to be responsive to the state of the lowest order addressing signal developed on line 406 of bus 270 and operative to store the state of each of the signals developed on bus 144 and to develop the re-read addressing signals on bus 218 so as to have the stored states.

Figure 8:
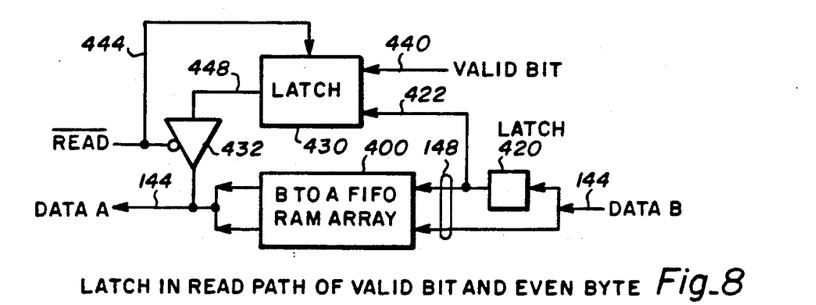
FIG. 8 is a schematic diagram of (a read latch) part of the nine-bit-to-eighteen-bit converter portion shown in FIG. 1.

So that words are written into FIFO (B→A) buffer portion 114 eighteen bits at a time, nine-bit-to-eighteen-bit converter portion 116 stores each even (nine-bit) word until the corresponding odd (nine-bit) word arrives. To permit access to the word (nine-bits) stored in portion 116 (latch 420), portion 116 additionally includes the (read latch) circuitry illustrated in FIG. 8. The read latch circuitry includes a ten-bit latch 430 and ten, tri-state, buffers, represented by a tri-state buffer 432. Latch 430 is configured with nine of a set of ten data inputs each connected to the corresponding line of bus 422 and with the remaining (tenth) data input of the set of (ten) data inputs connected to a line 440 to receive a valid bit signal derived from the line 406 (FIG. 7) write data addressing signal. Further, latch 430 is configured with a clock input connected to a line 444 to receive an (active low) read signal and with a set of ten data outputs each connected to the corresponding line of a ten line bus 448. The ten, tri-state, buffers, represented by tri-state buffer 432 are configured with the data input of each of the ten buffers connected to a respective one of the ten lines of bus 448 and with the enable input of each of the ten buffers connected to read line 444. The nine, tri-state, buffers which are connected to the lines of bus 448 that correspond to the lines of bus 422 are configured with the output of each of the buffers connected to a respective one of the eight lower-order data bit lines of data (A) bus 140 and the corresponding parity bit line of bus 140. The remaining, tenth, tri-state, buffer is configured with the buffer output connected to the lowest-order line of the eight higher-order data bit lines of data (A) bus 140.

Figure 9:
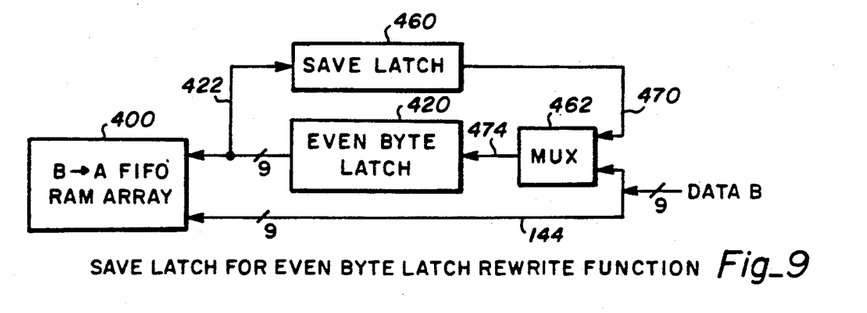
FIG. 9 is a schematic diagram of (a latch re-write part of the nine-bit-to-eighteen-bit converter portion shown in FIG. 1.

To save (for re-writing) the word (nine-bits) stored in latch 420 (of nine-bit-to-eighteen-bit converter portion 116) when FIFO (B→A) buffer portion 114 re-write pointer register 286 (FIG. 5) is loaded (saved), portion 116 additionally includes the (latch re-write) circuitry illustrated in FIG. 9. The latch re-write circuitry includes a latch 460 and a multiplexer 462. Latch 460 is configured with a set of nine data inputs each connected to a corresponding line of the nine lines of bus 422 and with a set of nine data outputs each connected to a corresponding line of a nine line bus 470. Multiplexer 462 is configured with a set of nine data outputs each coupled by a corresponding line of a nine line bus 474 to a corresponding input of the set of nine data inputs of latch 420. In addition, multiplexer 462 is configured with a first set of nine data inputs each connected to a corresponding line of the nine lines of bus 470. Further, multiplexer 462 is configured with a second set of nine data inputs each coupled by a corresponding one of nine buffers (not shown) to a corresponding one of the nine lines of data (B) bus 144.

Figures 10, 11:
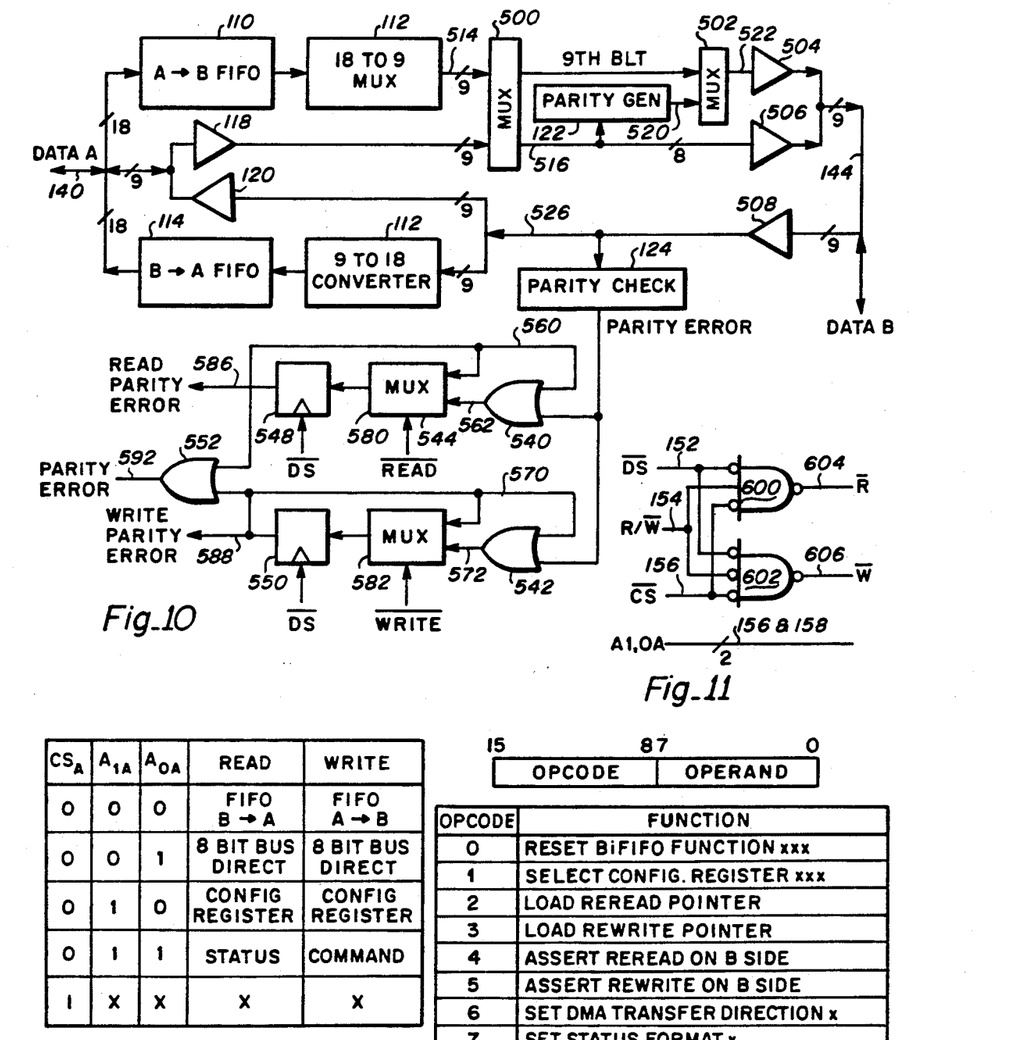
FIG. 10 is a schematic diagram further illustrating the bidirectional FIFO buffer shown in FIG. 1.
FIG. 11 is a schematic diagram of a part of the A-port access control portion shown in FIG. 1.

Turning now to FIG. 10, FIFO buffer 100 is shown to additionally employ a multiplexer 500; another multiplexer 502; nine, tri-state, buffers, one represented by a buffer 504 and the other eight represented by a buffer 506; and nine buffers, represented by a buffer 508. Multiplexer 500 is configured with a first set of nine data inputs each coupled by a corresponding line of a nine line bus 510 to the corresponding data output of the set of nine data outputs of eighteen-bit-to-nine-bit multiplexer portion 112. Further, multiplexer 500 is configured with a second set of nine data inputs each coupled by a corresponding line of a nine line bus 512 to the output of a corresponding one of the nine, tri-state, buffers, represented by buffer 118. Finally, multiplexer 500 is configured with a set of nine data outputs connected, the highest order (parity-bit) output to a line 514 and the eight lower order (data-bit) outputs each to a corresponding line of an eight line bus 516, which are each connected both to a corresponding one of the set of eight data inputs of parity generator portion 122 and to the data input of a corresponding one of the tri-state buffers represented by buffer 506.

Multiplexer 502 is configured with a first data input connected to line 514; with a second data input coupled by a line 520 to the data output of parity generator portion 122; and with a data output coupled by a line 522 to the data input of tri-state buffer 504. Tri-state buffer 504 is configured with the data input connected to line 522 and with the output connected to the highest order (parity-bit) line of data (B) bus 144. The nine, tri-state, buffers represented by buffer 506 are configured each with the data input connected to the corresponding line of the eight line bus 516 and each with the output connected to the respective line of the eight lower order (data-bit) lines of data (B) bus 144. The nine buffers represented by buffer 508 are configured each with the data input connected to the corresponding line of the nine line data (B) bus 144. Further, the nine buffers represented by buffer 508 are configured each with the output coupled by a corresponding line of a nine line bus 526 to the data input of the corresponding one of the nine, tri-state, buffers represented by buffer 120; to the corresponding data input of the set of nine data inputs of nine-bit-to-eighteen-bit converter portion 116; and to the corresponding data input of the set of nine data inputs of parity checking portion 124. The data output of parity checking portion 124 is connected to a line 528.

FIFO buffer 100 is additionally shown (in FIG. 10) to employ a pair of OR gates 540 and 542, a pair of multiplexers 544 and 546, a pair of D-type flip-flops (registers) 548 and 750, and another OR gate 552. OR gate 540 is configured with a first gate input connected to a line 560; with a second gate input connected to line 528; and with the gate output connected to a line 562. Similarly, OR gate 542 is configured with a first gate input connected to a line 570; with a second gate input connected to line 528; and with the gate output connected to a line 572. Multiplexer 544 is configured with a first data input connected to line 560; with a second data input connected to line 562; and with a data output connected to a line 580. Similarly, multiplexer 546 is configured with a first data input connected to line 570; with a second data input connected to line 572; and with a data output connected to a line 582. Flip-flop 548 is configured with a data input connected to line 580 and with a data output connected to a line 586, upon which the flip-flop develops a read parity error signal. Similarly, flip-flop 550 is configured with a data input connected to line 582 and with a data output connected to a line 588, upon which the flip-flop develops a write parity error signal. Finally, OR gate 552 is configured with a first gate input connected to line 586; with a second gate input connected to line 588; and with the gate output connected to a line 592, upon which the gate develops a parity error signal.

In FIG. 11, A-port access control portion 126 is shown to include a pair of NAND gates, respectively designated 600 and 602. Gate 600 is configured with a (negated) input connected to line 152, to receive the externally developed (active low) data strobe (A) signal, with a (true (non-negated)) input connected to line 154, to receive the externally developed read/write signal, a (negated) input connected to line 150, to receive the externally developed (active low) chip selecting (A) signal, and with an output connected to a line 604, upon which the gate develops an (active low) read signal. Gate 602 is configured with a (negated) input connected to line 152, to receive the externally developed (active low) data strobe (A) signal, with a (negated) input connected to line 154, to receive the externally developed read/write signal, a (negated) input connected to line 150, to receive the externally developed (active low) chip selecting (A) signal, and with an output connected to a line 606, upon which the gate develops an (active low) write signal.

In addition, A-port access control portion 126 includes a status register, a command register, eight configuration registers, and associated circuitry (all not shown). The status register is configured with a set of sixteen data outputs each connected to the corresponding one of the sixteen lines of the eighteen line data (A) bus 140 upon which the sixteen data bit signals are developed. The command register is configured with a set of sixteen data inputs each connected to the corresponding one of the sixteen data bit signal lines of data (A) bus 140. The configuration registers are each configured with a set of sixteen data inputs each connected to the corresponding one of the sixteen data bit signal lines of data (A) bus 140 and with a set of sixteen data outputs each connected to the corresponding one of the sixteen data bit signal lines of the data (A) bus.

Figures 12, 13:
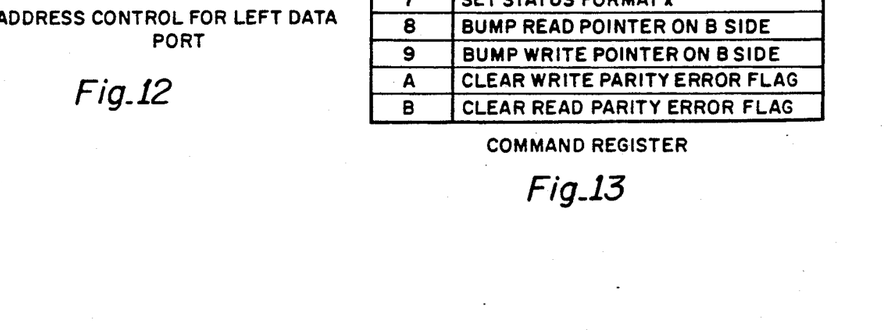
FIG. 12 is a diagram illustrating another part of the A-port access control ion shown in FIG. 1.
FIG. 13 is a diagram illustrating a command register of the A-port access control portion shown in FIG. 1.

A two-line-to-four-line selector/multiplexer (not shown) is configured with a set of two selector inputs each connected to a respective one of the lines 156 and 158 and with a set of four outputs connected to enable (select) the various components of FIFO buffer 100 as illustrated in FIG. 12. More specifically, responsive to signals developed on lines 156 and 158 the states of which represent an address of zero, FIFO (B→A) buffer portion 110 (FIG. 1) is selected to be read from and FIFO (A→B) buffer portion 110 (FIG. 1) is selected to be written to; responsive to signals which represent an address of one, the tri-state buffers represented by buffer 120 are selected to directly read from data (B) bus 144 and the tri-state buffers represented by buffer 118 are selected to directly write to data (B) bus 144; responsive to signals which represent an address of two, one of the configuration registers is selected to be read from and written to; and responsive to signals which represent an address of three, the status register is selected to be read from and the command register is selected to be written to. Circuitry connected to various outputs of a set of sixteen data outputs of the command register is configured to select one of two sets of signals to drive a set of sixteen data inputs of the status register and to enable (select) one of the configuration registers.

Figure 14:
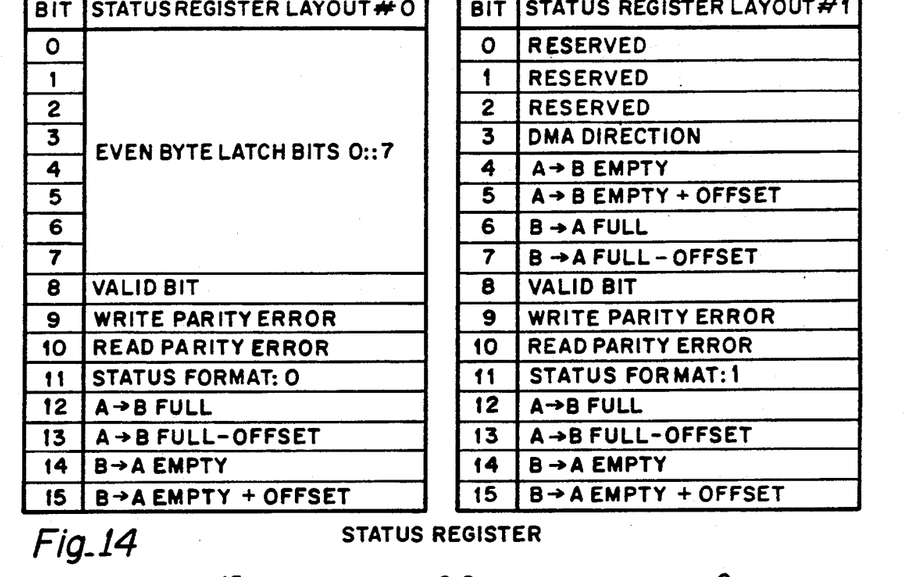
FIG. 14 is a diagram illustrating a status register of the port access control portion shown in FIG. 1.
Figure 15:
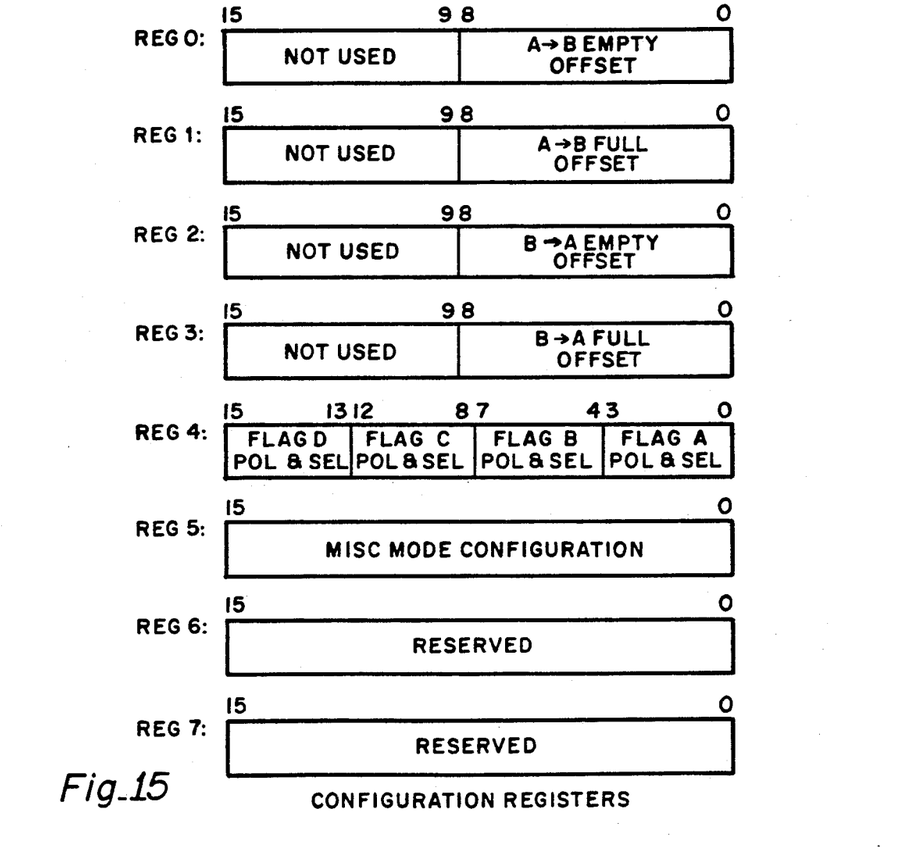

In addition, the various outputs of the set of data outputs of the command register are connected as illustrated in FIG. 13. The two sets of signals selectively coupled to drive the status register are illustrated in FIG. 14. Circuitry connected to a set of sixteen data outputs of each of the configuration registers is configured as illustrated in FIG. 15. The flag polarities selected responsive to the configuration register number four signals are illustrated in FIG. 16; the function assignments of the configuration register number five signals are illustrated in FIG. 17; and, the function assignments of the configuration register number seven signals are illustrated in FIG. 18.

Figure 19:
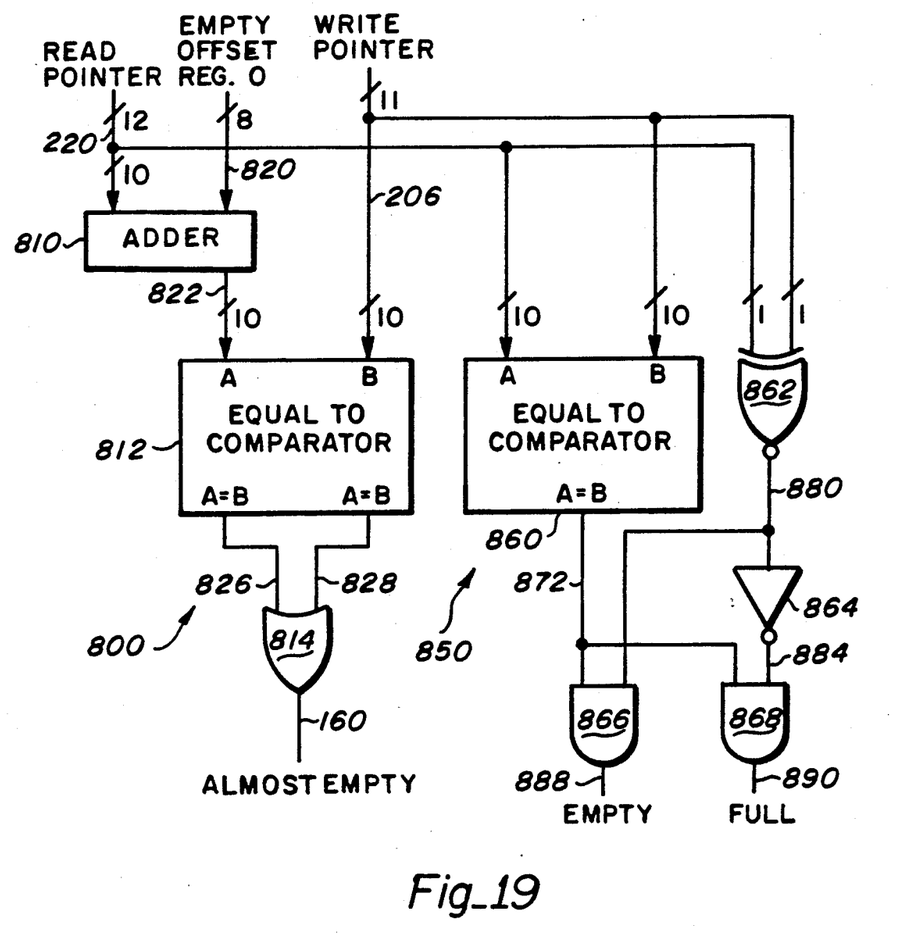
FIG. 19 is schematic diagram of a portion of the programmable flag logic portion shown in FIG. 1.

Programmable flag logic portion 128 includes four similar portions, one of which is shown In FIG. 19, generally designated by the number 800. Portion 800 includes an adder 810, an equal to comparator 812, and a two-input, OR gate 814. Adder 810 is configured with a set of ten inputs each connected to bus 220. The set of ten adder 810 inputs are not connected to a line of bus 220 upon which the highest order addressing signal is developed nor to a line of the bus (220) upon which the lowest order addressing signal is developed. Also, adder 810 is configured with a set of eight inputs each connected to the corresponding line of an eight line bus 820 to receive signals representing an empty offset developed by configuration register zero (FIG. 15). Further, adder 810 is configured with a set of ten outputs each connected to the corresponding line of a ten line bus 822. Equal to comparator 812 is configured with a first set of ten (A) inputs each connected to the corresponding line of bus 822 and with a second set of ten (B) inputs each connected to bus 206. The second set of ten comparator 812 (B) inputs are not connected to a line of bus 206 upon which the highest order addressing signal is developed. Further, comparator 812 is configured with an (A=B) equal output connected to a line 826 and a (A<B) less than output connected to a line 828. Gate 814 is configured with one of the two gate inputs connected to line 826; with the other one of the two gate inputs connected to line 828; and with the gate output connected to line 160.

Further, programmable flag logic portion 128 includes two similar portions, one of which is shown In FIG. 19, generally designated by the number 880. Portion 850 includes an equal to comparator 860, an exclusive OR gate 862, an inverter 864, and a pair of two-input, AND gates, respectively designated 866 and 868. Equal to comparator 860 is configured with a first set of ten (A) inputs each connected to bus 220. Again, the (first) set of ten comparator 860 (A) inputs are not connected to a line of bus 220 upon which the highest order addressing signal is developed nor to a line of the bus (220) upon which the lowest order addressing signal is developed. Also, comparator 860 is configured with a second set of ten (B) inputs each connected to bus 206. Again, the second set of ten comparator 860 (B) inputs are not connected to a line of bus 206 upon which the highest order addressing signal is developed. Further, comparator 860 is configured with an (A=B) equal output connected to a line 872. It is important to note that when comparator 860 develops on line 872 a signal which indicates that the numbers represented by the ten bus 220 and ten bus 206 signals are equal, the (A→B) FIFO buffer (110) may be either empty or full. Gates 862, 866, and 868 and inverter 864 are configured to remove the ambiguity. More specifically, gate 862 is configured with one of the two gate inputs connected to the highest order line of bus 220, designated 876; with the other one of the two gate inputs connected to the highest order line of bus 206, designated 878; and with the gate output connected to a line 880. Inverter 864 is configured with the inverter input connected to line 880 and with the inverter output connected to a line 884. Gate 866 is configured with one of the two gate inputs connected to line 872; with the other one of the two gate inputs connected to line 880; and with the gate output connected to a line 888. Gate 868 is configured with one of the two gate inputs connected to line 872; with the other one of the two gate inputs connected to line 884; and with the gate output connected to a line 890.

Figure 20:
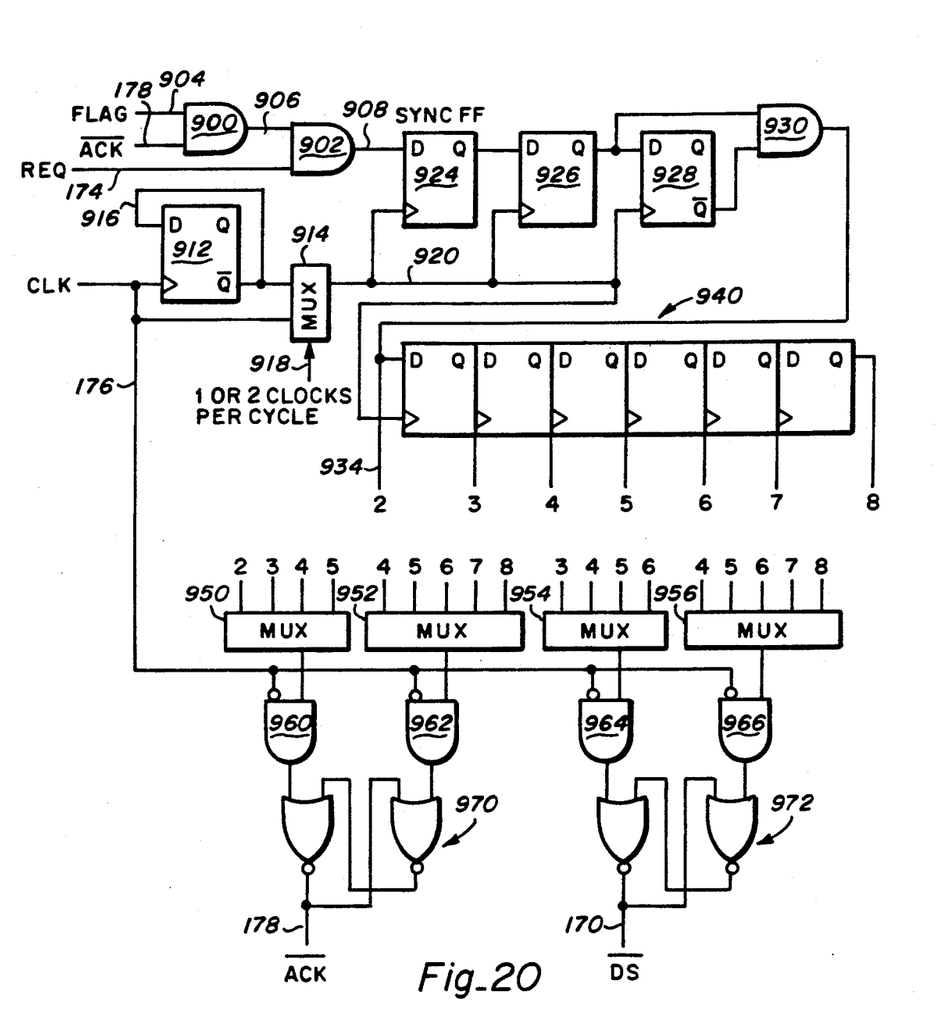
FIG. 20 is a schematic diagram of the hand shake interface control portion shown in FIG. 1.

In FIG. 20 hand shake interface control portion 132 is shown to include a pair of two-input AND gates, respectively designated 900 and 902. AND gate 900 is configured with one of the gate inputs connected to a line 904, to receive a flag signal; with the other one of the gate inputs connected to line 178, to receive the (DMA) acknowledge signal; and a gate output connected to a line 906. AND gate 902 is configured with one of the gate inputs coupled to the output of gate 900 by line 906; with the other one of the gate inputs connected to line 174, to receive the (DMA) request signal and a gate output connected to a line 906. In addition, portion 132 is shown to include a D-type flip-flop 912 and a multiplexer 914. Flip-flop 912 is configured with the flip-flop clock input connected to line 174 and both the flip-flop data input and the flip-flop inverting data output connected to a line 916, to develop on line 916, a signal the frequency of which is one half that of the the clocking signal developed on line 174. Multiplexer 914 is configured with a first data input coupled to the data output of flip-flop 902 by line 914; with a second data input connected to line 174; with a select input connected to a line 918; and with a data output connected to a line 920, to selectively couple to line 918, either the clocking signal developed on line 176 or the half-frequency clocking signal developed by flip-flop 912 on line 916.

Further, hand shake interface control portion 132 is shown to include three, D-type, flip-flops, respectively designated 924, 926, and 928 and an exclusive-OR gate 930. To synchronize and delay the gate 902 developed signal and to develop a pulse (signal) one clocking cycle wide, the three flip-flops (924, 926, and 928) are connected in cascade with the data input of the first flip-flop (924) connected to line 908 and with the clock input of each of the flip-flops connected to line 920. Gate 930 is configured with one of the gate inputs connected to the data input of the last flip-flop (928); with the other one of the gate inputs connected to the inverting output of the last flip-flop; and with the gate output connected to a line 934.

Also, hand shake interface control portion 132 includes a six-stage shift register 940, configured with the data input coupled to the output of gate 930 by line 934 to develop further delayed pulses (signals). To select four of the various delayed pulses, portion 132, also, includes four, four-line-to-one-line multiplexers, respectively designated 950, 952, 954, and 956; four, two-input, AND gates, respectively designated 960, 962, 964, and 966; and two set-reset flip-flops, respectively designated 970 and 972. The multiplexers (950, 952, 954, and 956) are configured to select the one of the delayed pulses which is designated by signals developed by configuration register number five (FIGS. 14 and 16) and the following three delayed pulses. The AND gates (960, 962, 964, and 966) are configured to synchronize the multiplexed pulses, each with the line 176 clocking signal. Finally, the set reset flip-flops are configured, one (970) to be set by the first synchronized pulse and reset by the next (second) synchronized pulse, to develop the line 178 acknowledge signal; and, the other one (of the set-reset flip-flops) (972) to be set by the third synchronized pulse and reset by the last (fourth) synchronized pulse, to develop the line 170 data strobe (B) signal.

In the presently preferred embodiment, the various components of FIFO buffer 100 are all integrated into a single device using CMOS technology.

It is contemplated that after having read the preceding disclosure, certain alterations and modifications of the present invention will no doubt become apparent to those skilled in the art. It is therefor intended that the following claims be interpreted to cover all such alterations and modifications as fall within the true spirit and scope of the invention.

What is claimed is:

1. A FIFO buffer all integrated into a single device, the buffer comprising in combination:
  write pointer counter means (204) for developing signals representing a random access memory array write address;
  read pointer counter means (216) for developing signals representing a random access memory array read address, said read pointer counter means being responsive to an externally generated re-read signal and operative to load a re-read address;

re-read pointer register means (236) connected to said read pointer counter means, said re-read pointer register means for developing signals representing said re-read address, said re-read pointer register means being responsive to an externally generated load re-read pointer command signal and operative to load said random access memory array read address; and, dual port, random access memory array means (300) having a set of data inputs, a set of data ouputs, a set of write addressing inputs connected to said write pointer counter means and a set of read addressing inpus connected to said read pointer counter means, said random access memory array means for receiving at said data inputs externally generated signals representing a word of data, for storing said received data word at said random access memory array write address, and for developing at said data outputs signals representing the work of data stored at said random access memory array read address.

2. A FIFO buffer as recited in claim 1 wherein said write pointer counter means further develops a higher order bit signal, wherein said read pointer counter means further develops a higher order bit signal, and wherein said FIFO buffer further comprises, comparator means (860) connected to said write pointer counter means and to said read pointer counter means, said comparator means for comparing said write address with said read address and for developing a signal which indicates when said write address is equal to read address;

exclusive OR gate (862) connected to said write pointer counter means and to said read pointer counter means, said exclusive OR gate for developing a signal which represents the gate combination of said write pointer counter means high order bit signal and said read pointer counter means higher order bit signal; and gate means (864, 866 and 868) connected to said comparator means and to said exclusive OR gate, said gate means for developing at least one flag signal (888 or 890) which represents the gated combination of said comparator means developed signal and said exclusive OR gate developed signal.

3. A FIFO buffer all integrated into a single device, the buffer comprising in combination:

read pointer counter means (254) for developing signals representing a random access memory array read address;

write pointer counter means (266) for developing signals representing a random access memory array write address, said write pointer counter means being responsive to an externally generated re-write signal and operative to load a re-write address;

re-write pointer register means (286) connected to said write pointer counter means, said re-write pointer register means for developing signals representing said rewrite address, said re-write pointer register means being responsive to a load re-write pointer command signal and operative to load said random access memory array write address; and, dual port, random access memory array means (400) having a set of data inputs, a set of data outputs, a set of write addressing inputs connected to said write pointer counter means and a set of read addressing inputs connected to said read pointer counter means, said random access memory array means for receiving at said data inputs externally generated signals representing a word of data, for storing said received data word at said random access memory array write address, and for developing at said data outputs signals representing the word of data stored at said random access memory array read address.

4. A FIFO buffer system all integrated into a single device, the system comprising in combination:

an A bust (140);

a B bus (144);

a FIFO buffer (110) connected to said A bus, said FIFO buffer including, write pointer counter means (204) for developing signals representing a random access memory array write address, read pointer counter means (216) for developing signals representing a random access memory array read address, said read pointer counter means being responsive to an externally generated re-read signal and operative to load a re-read address, re-read pointer register means (236) connected to said read pointer counter means, said re-read pointer register means for developing signals representing said re-read address, said re-read pointer register means being responsive to an externally generated load re-read pointer command signal and operative to load said random access memory array read address, and dual port, random access memory array means (300) having a set of data inputs connected to said A bus, a set of data outputs, a set of write addressing inputs connected to said write pointer counter means, and a set of read addressing inputs connected to said read pointer counter means, said random access memory array means for receiving at said data inputs externally generated signals representing an m-bit word, for storing said received m-bit at said random access memory array write address, and for developing at said data outputs signals representing said m-bit word stored at said random access memory array read address, where m is a positive integer of at least sixteen; and, multiplexer means (112) connected to said FIFO buffer and to said B bus, said multiplexer means for receiving each of said stored m-bit words and for developing on said B bus signals representing, first, an n-bit portion and, next, another, different, n-bit portion of each of said stored m-bit words where n is a positive integer of at least eight; and, 5. A FIFO buffer system as recited in claim 4 further comprising tri-state buffer means (118) connected to said A bus and to said B bus, said tri-state buffer means for receiving signals representing an n-bit portion of each m-bit word and for selectively developing on said B bus signals representing said n-bit portion.

6. A FIFO buffer systems all integrated into a single device, the system comprising in combination:

an A bus (140);

a B bus (144);

converter means (116) connected to said B bus, said converter means for receiving signals representing a succession of n-bit works, for assembling at least two of said received n-bit words into one m-bit word, and for developing signals representing, in succession, said assembled m-bit words, where m is a positive integer of at least sixteen and where n is a positive integer of at least eight; and, a FIFO buffer (114) connected to said converter means and to said A bus, said FIFO buffer including, read pointer counter means (254) for developing signals representing a random access memory array read address, write pointer counter means (266) for developing signals representing a random access memory array write address, said write pointer counter means being responsive to an externally generated re-write signal and operative to load a re-write address, re-write pointer register means (286) connected to said write pointer counter means, said re-write pointer register means for developing signals representing said re-write address, and re-writed pointer register means being responsive to an externally generated load re-write pointer command signal and operative to load said random access memory array write address, and random access memory array means (400) connected to said converter means, to said write pointer counter means, to said read pointer counter means, and to said A bus, said random access memory array means for receiving each of said assembled m-bit words, for storing said received m-bit data word at said random access memory array write address and for developing on said A bus signals representing the m-bit data word stored at said random access memory array read address.

7. A FIFO buffer system as recited in claim 6 further comprising tri-state buffer means (120) connected to said B bus and to said A bus, said tri-state buffer means for receiving signals representing each of said m-bit words and for selectively developing on said A bus signals representing said m-bit words.

8. A FIFO buffer system as recited in claim 6 wherein said converter means includes first latch means (420) having a set of data inputs coupled to said B bus, a clock input connected to said read pointer counter means, and a set of data outputs connected to said random access memory array means.

9. A FIFO buffer system as recited in claim 8 wherein said converter means further includes, second latch means (430) having a set of data inputs connected to said first latch means set of data outputs, a clock input, and a set of data outputs and tri-state buffer means (432) having a set of data inputs connected to said second latch means set of data outputs, an enable input connected to said second latch means clock input, and a set of outputs connected to said A bus.

10. A FIFO buffer system as recited in claim 8 wherein said converter means further includes, second latch means (460) having a set of data inputs connected to said first latch means set of data outputs, a clock input, and a set of data outputs and multiplexer means (462) having a first set of data inputs connected to said second latch means set of data outputs, a second set of data inputs connected to said B bus, and a set of data outputs connected to said first latch means set of data inputs.

11. A FIFO buffer system as recited in claim 10 wherein said converter means further includes, third latch means (430) having a set of data inputs connected to said first latch means set of data outputs, a clock input, and a set of data outputs and tri-state buffer means (432) having a set of data inputs connected to said third latch means set of data outputs, an enable input connected to said third latch means clock input, and a set of outputs connected to said A bus.

* * * * *

UNITED STATES PATENT AND TRADEMARK OFFICE
CERTIFICATE OF CORRECTION

PATENT NO. : 5,079,693
DATED : January 7, 1992
INVENTOR(S) : Michael J. Miller

It is certified that error appears in the above-identified patent and that said Letters Patent is hereby corrected as shown below:

Amend Fig. 10 of the drawings to include a dot at the intersection of lines 560 and 586.

Column 9, line 21, change "750" to "550"

Signed and Sealed this

Sixth Day of July, 1993

Attest:

MICHAEL K. KIRK

Attesting Officer    Acting Commissioner of Patents and Trademarks